(12) United States Patent
Goddard et al.

(10) Patent No.: US 8,693,032 B2
(45) Date of Patent: Apr. 8, 2014

(54) METHODS AND STRUCTURE FOR IMPROVED PRESENTATION OF JOB STATUS IN A PRINT SERVER

(75) Inventors: Joan Stagaman Goddard, Boulder, CO (US); Kumar V. Kadiyala, Boulder, CO (US)

(73) Assignee: Ricoh Company, Ltd., Tokyo (JP)

( * ) Notice: Subject to any disclaimer, the term of this patent is extended or adjusted under 35 U.S.C. 154(b) by 290 days.

(21) Appl. No.: 12/859,102

(22) Filed: Aug. 18, 2010

(65) Prior Publication Data

US 2012/0044520 A1 Feb. 23, 2012

(51) Int. Cl.
*G06F 3/12* (2006.01)
*G06K 13/00* (2006.01)
*H04N 1/40* (2006.01)

(52) U.S. Cl.
USPC .......... 358/1.15; 358/1.2; 358/1.13; 358/1.14; 400/61

(58) Field of Classification Search
USPC .......... 358/1.12, 1.14, 1.15; 382/1.12; 400/61
See application file for complete search history.

(56) References Cited

U.S. PATENT DOCUMENTS

| | | | |
|---|---|---|---|
| 5,580,177 A * | 12/1996 | Gase et al. | 400/61 |
| 6,639,687 B1 | 10/2003 | Neilsen | |
| 6,709,176 B2 * | 3/2004 | Gotoh et al. | 400/61 |
| 7,304,753 B1 | 12/2007 | Richter | |
| 7,382,477 B2 | 6/2008 | Wanda | |
| 7,528,981 B2 | 5/2009 | Johnson | |
| 7,596,244 B2 * | 9/2009 | Farrell | 382/112 |
| 7,916,324 B2 * | 3/2011 | Tanaka | 358/1.15 |
| 8,004,702 B2 * | 8/2011 | Noda | 358/1.15 |
| 2002/0026379 A1 * | 2/2002 | Chiarabini et al. | 705/26 |
| 2002/0196460 A1 * | 12/2002 | Parry | 358/1.15 |
| 2005/0046705 A1 * | 3/2005 | Smith | 348/231.2 |
| 2006/0044594 A1 * | 3/2006 | Shirai | 358/1.14 |
| 2006/0192985 A1 | 8/2006 | Shen | |
| 2007/0229879 A1 * | 10/2007 | Harmon et al. | 358/1.15 |
| 2007/0229896 A1 | 10/2007 | Fujimori | |
| 2007/0285701 A1 * | 12/2007 | Ohta et al. | 358/1.14 |
| 2009/0201537 A1 | 8/2009 | Araya | |
| 2009/0217268 A1 | 8/2009 | Pandit | |

OTHER PUBLICATIONS

Bergmarm, R et al, "Job Monitoring MIB—V1.0 (RFC2707)," Nov. 1, 1999, Source: IP.com No. IPCOM000003301D, all pages.

* cited by examiner

*Primary Examiner* — Akwasi M Sarpong
(74) *Attorney, Agent, or Firm* — Duft Bornsen Fettig LLP

(57) ABSTRACT

Methods and associated structure for displaying the status of a plurality of print jobs using a graphical user interface to present a broad overview of the status of the print jobs. Status information regarding the plurality of print jobs is received from one or more print servers. The status of each job is analyzed to associate a top-level category with each job and a status sub-category with each job. A graphical object is presented to the user to represent each of the top-level categories and each of the sub-categories within each top-level category. A count of the number of jobs associated with each graphical object may be presented to the user as a number associated with the graphical object. The graphical objects may be color-coded to indicate the level of operator intervention (if any) required for the print jobs associated with the corresponding top-level category or sub-category.

20 Claims, 6 Drawing Sheets

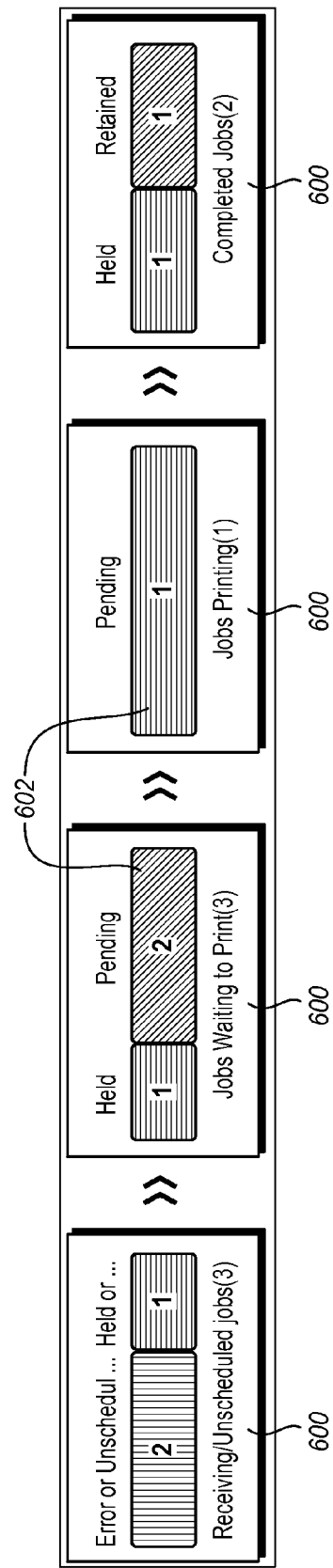

METHODS AND STRUCTURE FOR IMPROVED PRESENTATION OF JOB STATUS IN A PRINT SERVER

BACKGROUND

1. Field of the Invention

The invention relates generally to presentation of status information regarding a plurality of print jobs and more specifically relates to methods and structure for presenting an easy to use and easy to understand display of the status of a plurality of print jobs being processed by one or more print servers.

2. Discussion of Related Art

In some printing enterprises, one or more print servers are used for processing print jobs—i.e., to layout, format, and render print jobs for transmission to printing engines. Users submit print jobs to the print servers and await the desired output from a print engine coupled with a print server processing the print job. Individual users and/or enterprise administrators often wish to view the status of print jobs being processed by the print servers. Present techniques for viewing such status generally present the status information in a complex, confusing, hard to understand format. For example, all print jobs may simply be listed in a textual, tabular format such that the user/administrator has to review a lengthy list of job status information to locate particular jobs that may require attention. Or, for example, the status a single pint job may be presented to a user in response to a user's request for status of a particular job. In general, prior techniques do not provide a broad overview of the status of a plurality of print jobs but rather focus on the status of a single print job for which a user is requesting the status.

Thus, it is an ongoing challenge to improve the ease of use for a user in presenting the status of a plurality of print jobs being processed by one or more print servers.

SUMMARY

The present invention solves the above and other problems, thereby advancing the state of the useful arts, by providing methods and associated structure for displaying the status of a plurality of print jobs using a graphical user interface to present a broad overview of the status of the print jobs. Status information regarding the plurality of print jobs is received from one or more print servers. The status of each job is analyzed to associate a top-level status/progress category with each job and a status sub-category with each job. In one exemplary embodiment, the top-level status/progress category associated with a print job may represent progress or flow of the print job through common stages/phases of processing of a print job. In other words, a first top-level category may represent jobs in an early stage of being received at a print server or early stages of processing within a printer server. A next top-level category may then represent print jobs in an intermediate stage of processing within a print server. Still another top-level category may represent jobs for which print server processing is essentially complete and have been sent to an appropriate print engine for imprinting on appropriate media. In one exemplary embodiment, the status sub-categories associated with each of the top-level status/progress categories and associated with a print job may represent a more detailed status of the print job within the broader progress/flow represented by the top-level category. A graphical object is presented to the user to represent each of the top-level categories and each of the sub-categories within each top-level category. In one exemplary embodiment, the graphical object associated with a top-level category may be a simple graphical container (e.g., a graphical object on which other graphical objects are superposed to represent the associated sub-categories). In one exemplary embodiment, the graphical objects representing the sub-categories may be segments of a bar chart to reflect the number of print jobs associated with each sub-category relative to the total number of print jobs associated with the top-level category that includes the sub-category graphical objects. A count of the number of print jobs associated with each top-level category and/or with each sub-category may be presented to the user on the display as one or more numbers associated with the graphical objects representing each top level-category and/or representing each sub-category. The graphical objects for each sub-category may be color-coded to indicate the level of operator intervention (if any) required for the print jobs associated with that sub-category.

One aspect hereof provides a method and/or a computer readable medium embodying the method for presenting job status information to a user. The method comprising receiving status information regarding one or more print jobs being processed by one or more print servers associated with the computer system. The method then associates a top-level category with each of the one or more print jobs. The top-level category associated with said each print job is selected from a plurality of top-level categories based on the status information regarding said each print job. The method also associates a sub-category within each top-level category with each of the one or more print jobs. The sub-category associated with said each print job is selected from a plurality of sub-categories based on the status information regarding said each print job. The method then outputs a status presentation on a display coupled with the computer system. The status presentation comprises a plurality of top-level graphical objects each representing a corresponding top-level category of the plurality of top-level categories. The status presentation further comprises a plurality of sub-category graphical objects associated with each of the plurality of top-level graphical objects. Each sub-category graphical object represents a corresponding sub-category. The status presentation further comprises a number associated with a graphical object. The number indicates a number of print jobs that are associated with the sub-category or category represented by said graphical object.

Another aspect hereof provides a print job status presentation system. The system comprises a processor adapted to present status information regarding a plurality of print jobs, a network interface coupled with the processor to couple the system with one or more print servers, and a user display coupled with the processor and adapted to display a presentation generated by the processor to represent the status information. The processor is adapted to receive status information from the one or more print servers through the network interface. The status information regards one or more print jobs being processed by the one or more print servers. The processor is further adapted to associate a top-level category with each of the one or more print jobs. The top-level category associated with said each print job is selected from a plurality of top-level categories based on the status information regarding said each print job. The processor is further adapted to associate a sub-category within each top-level category with each of the one or more print jobs. The sub-category associated with said each print job is selected from a plurality of sub-categories based on the status information regarding said each print job. The processor is further adapted to output a status presentation on the user display. The status presentation comprises a plurality of top-level graphical objects each representing a corresponding top-level category of the plurality of top-level categories. The status presentation further comprises a plurality of sub-category graphical objects associated with each of the plurality of top-level graphical objects. Each sub-category graphical object represents a corresponding sub-category. The status presentation further comprises a number associated with a graphical object. The number indicates a number of print jobs that are associated with the sub-category or category represented by said graphical object.

BRIEF DESCRIPTION OF THE DRAWINGS

The same reference number represents the same element or same type of element on all drawings.

FIG. 6 shows an exemplary presentation of the status of a plurality of print jobs as may be displayed to a user in accordance with features and aspects hereof.

DETAILED DESCRIPTION OF THE DRAWINGS

FIGS. 1 through 6 and the following description depict specific exemplary embodiments of the present invention to teach those skilled in the art how to make and use the invention. For the purpose of this teaching, some conventional aspects of the invention have been simplified or omitted. Those skilled in the art will appreciate variations from these embodiments that fall within the scope of the present invention. Those skilled in the art will appreciate that the features described below can be combined in various ways to form multiple variations of the present invention. As a result, the invention is not limited to the specific embodiments described below, but only by the claims and their equivalents.

Figure 1:
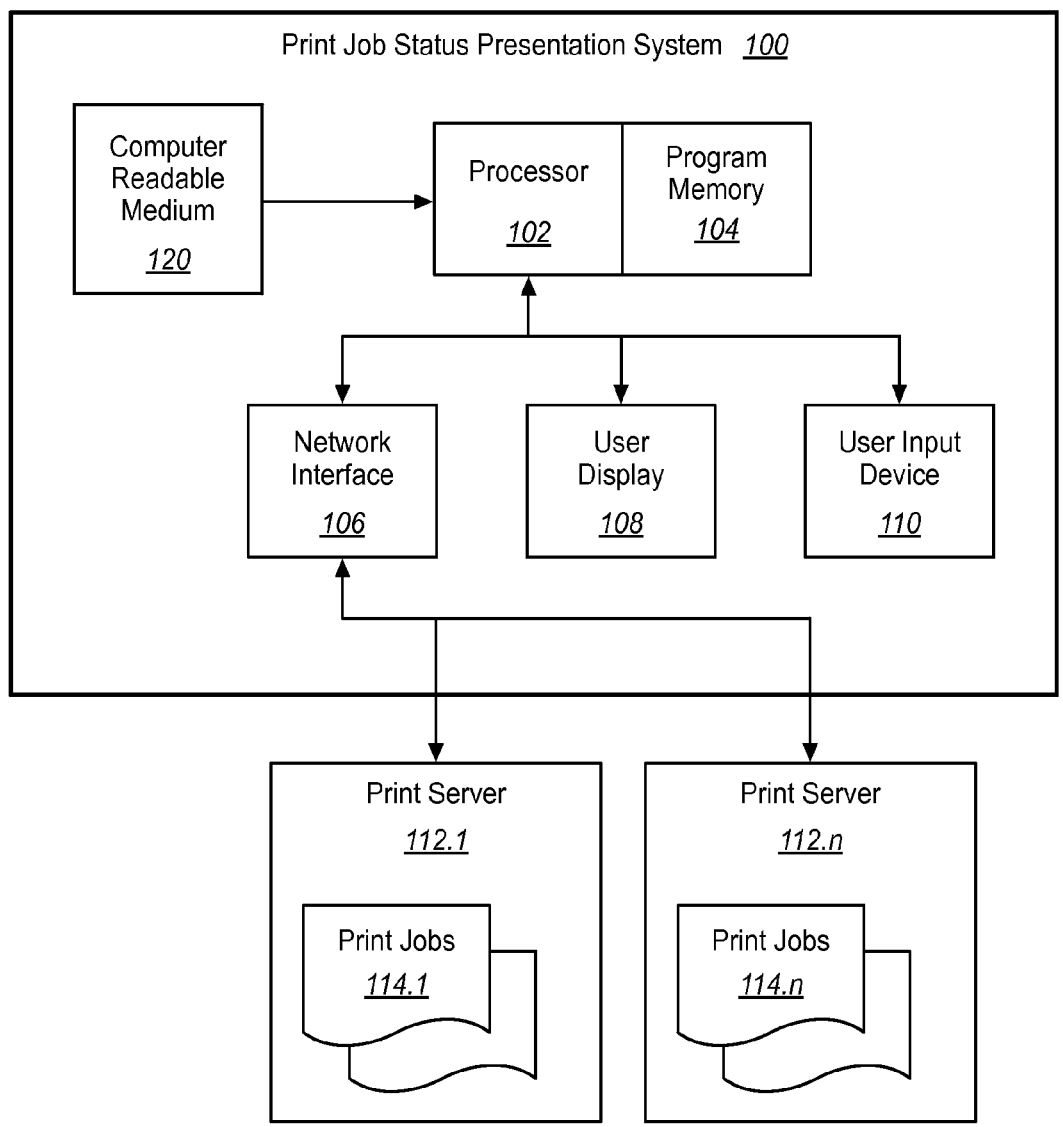
FIG. 1 is a block diagram of an exemplary print job status presentation system for presenting the status of a plurality of print jobs to a user in accordance with features and aspects hereof.

FIG. 1 is a block diagram of an exemplary print job status presentation system 100 enhanced in accordance with features and aspects hereof to provide a simpler, easier to use, presentation of the status of print jobs being processed by print servers. System 100 may be any suitable computing device including personal computers, workstations, servers, etc. System 100 comprises a processor 102 coupled with program memory 104. Processor 102 may be any suitable general-purpose processor adapted for fetching and executing programs from program memory 104. Program memory may be any suitable memory for storing programmed instructions and related data for use by processor 102.

System 100 also comprises network interface 106 coupled with processor 102 to enable system 100 to communicate with one or more print servers 112.1 through 112.n. Network interface 106 may couple system 100 with any suitable network communication media using any suitable protocol including, for example, an Ethernet network utilizing TCP/IP protocols. System 100 also comprises user display 108 for displaying a graphical presentation of job status for a plurality of print jobs 114.1 through 114.n in various stages of processing by print servers 112.1 through 112.n. User display 108 may be any suitable display component integrated with the system 100 or coupled with system 100 including, for example, CRT displays, LCD displays, projection displays, etc. Still further, system 100 may comprise user input device 110 for receiving user input from a user system 100 directing certain operations performed by processor 102 of system 100. User input device 110 may be any suitable input device including, for example, a keyboard, a keypad, voice command features, pointer devices (e.g., mouse, trackball, touch screen, etc.), etc.

System 100 may be coupled with one or more print servers 112.1 through 112.n. Each print server may be any suitable computing device adapted to process print jobs received from client devices (not shown) and adapted to generate output to be applied to a printing engine (not shown). As generally known in the art, print servers perform formatting, layout, and/or rendering of images to be imprinted by print engines based on input document source provided by an attached client device. In the processing of print servers 112.1 through 112.n, a plurality of print jobs 114.1 through 114.n may be queued for processing by the corresponding print servers. Each individual print job may progress through various stages of processing by a print server. Print servers 112.1 through 112.n are therefore operable to provide status information to system 100 through network interface 106. The status information indicates the current progress/state/stage of processing for each print job queued for processing or presently undergoing processing by a corresponding print server. Those of ordinary skill in the art will readily recognize that the services provided by one or more print servers 112.1 through 112.n may be provided by any number of suitable computing nodes. Further, the features of system 100 may be provided in the same computing device as one of the print servers or may be implemented as a separate computing system as a matter of design choice.

Methods operable within system 100 (discussed further herein below) provide a user with a simplified, easy to use presentation of the status of print jobs being processed in the print servers coupled with the system 100 (e.g., methods implemented as programmed instructions stored in program memory 104 and executed by processor 102). In general, system 100 is operable to receive print job status information from each print server 112.1 through 112.n. The print job status information comprises status regarding each of the print jobs presently queued for processing or presently being processed by each corresponding print server. Responsive to receipt of the status information, system 100 is further adapted to associate one of a plurality of top-level categories with each print job based on the status information for that print job. Any number of such top-level categories may be defined for use within system 100 as appropriate for a particular printing enterprise and application. System 100 is further adapted to associate one of a plurality of sub-categories with each print job based on the status information for that print job. Again, any number of sub-categories may be defined in association with each top-level category as appropriate for a particular printing enterprise and application. Exemplary top-level categories and exemplary sub-categories are discussed further herein below. System 100 is further operable to generate and output a presentation of the status information in a simpler, easy to use, easy to understand format based on the top-level categories and the sub-categories associated with each print job. The presentation is provided to the user through user display 108. In addition, system 100 may be further adapted to receive input from user input device 110 requesting that a particular top-level category or sub-category be selected for presentation of a more detailed output indicating the details of jobs associated with the selected top-level category or sub-category. System 100 is further operable to generate and output status information in such a more detailed format and present it to the user through user display 108.

In one exemplary embodiment, system 100 may be physically integrated with one or more printer servers 112.1 through 112.n. In such an embodiment, features and aspects described above as operable in system 100 may be, in whole or in part, performed within the one or more print servers 112.1 through 112.n. For example, a print server 112.1 through 112.n may perform processing to identify the present status of each print job and to associate both a top-level category (e.g., indicative of the print job's progress) and a sub-status category (e.g., indicative of the detailed status of the print job) with each print job. Other processing aspects hereof may then prepare a presentation of that status information and deliver that presentation to a user through an appropriate user interface. For example, in one exemplary embodiment, the prepared status presentation may be provided to the user as a web page to be presented on a user's web browser client system. Thus, the user input device (110) and the user display (108) may simply be user interface components of a web browser client process/system operable on a print server computing node or any other suitable computing node coupled with the print servers 112.1 through 112.n.

Embodiments of the invention can take the form of an entirely hardware embodiment, an entirely software embodiment or an embodiment containing both hardware and software elements. In the exemplary embodiment of system 100 of FIG. 1, the invention is implemented in software, which includes but is not limited to firmware, resident software, microcode, etc. Thus, processor 102 of system 100 is adapted to provide features and aspects hereof by loading (e.g., into program memory 104) programmed instructions stored on a computer readable storage medium 120 and executing the instructions to perform one or more of the methods depicted herein.

Furthermore, embodiments of the invention can take the form of a computer program product accessible from a computer-usable or computer-readable medium 120 providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W), DVD, etc.

Those of ordinary skill in the art will readily recognize numerous additional and equivalent components that may be present in a fully functional system 100. Such additional and equivalent components are omitted herein for simplicity and brevity of this discussion.

Figure 2:
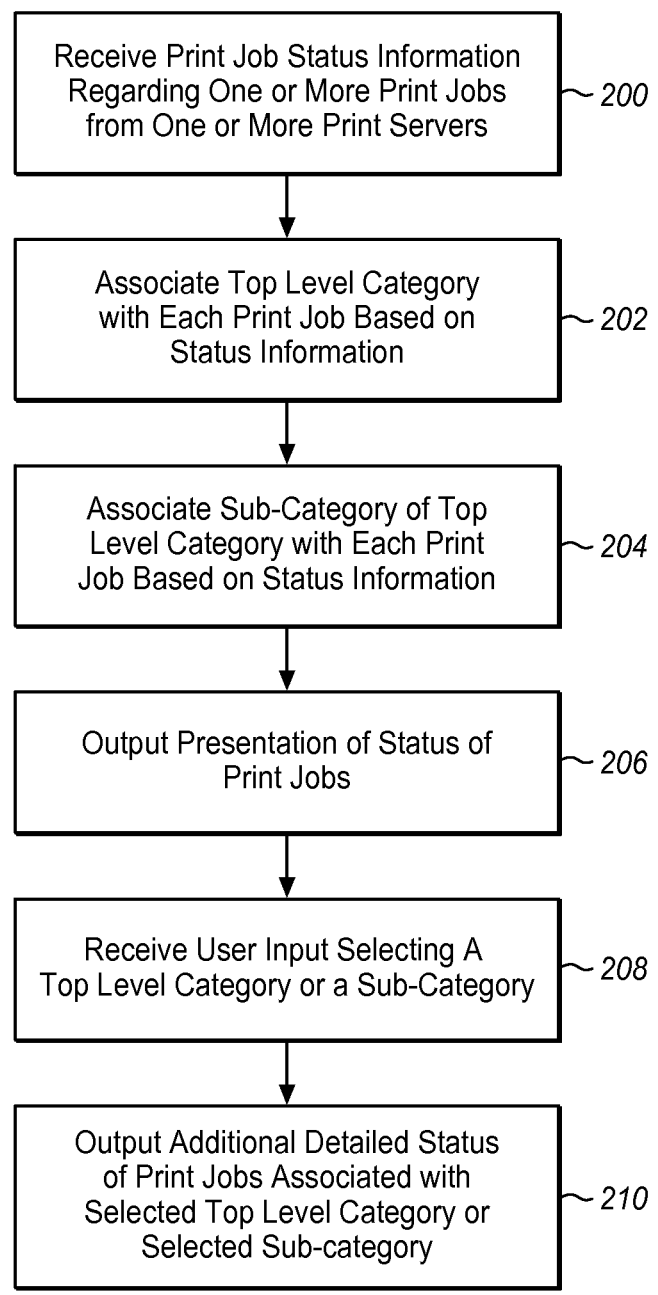
FIGS. 2 through 5 are flowcharts exemplary methods for presenting status of a plurality of print jobs to a user in accordance with features and aspects hereof.

FIG. 2 is a flowchart describing an exemplary method in accordance with features and aspects hereof to receive status information regarding a plurality of print jobs and to output a simpler, easy to use presentation of the status information. The method of FIG. 2 may be operable in any suitable computing device including, for example, system 100 of FIG. 1. Step 200 receives print job status information regarding one or more print jobs from each of one or more print servers. Based on the received status information, step 202 associates a top-level category with each print job based on the received status information. As noted above, any number of such top-level categories may be defined as appropriate for a particular printing enterprise or application. In one exemplary embodiment, the top-level category indicates or represents a stage of processing of the print job within a print server (e.g., the "progress" of the print job as regards processing by the print server and eventual imprinting by a print engine). In an exemplary embodiment, four top-level categories may be defined to broadly represent the progress/status of all print jobs. This broad modeling of the flow of print jobs through one or more print servers helps to simplify the presentation of job status to the user. This 4-stage model broadly applies to model the flow of print jobs through most, if not all, print servers. For example, a "Receiving/Unscheduled" top-level category may be associated with print jobs that are being received by a print server and/or have been received but not yet scheduled by the print server to be output to a particular print engine. A "Waiting to Print" top-level category may be associated with print jobs that have been received by the print server and have been scheduled to be sent to an identified printer but are not yet downloaded from the print server to that identify printer. A "Jobs at Printer" top-level category may be associated with jobs that have been sent to an identified printer from the print server but have not yet completed printing. Lastly, a "Completed" top-level category may be associated with jobs that are in some stage of printing by the print engine and/or have already been completed by the print engine.

At step 204, a sub-category is associated with each print job based on the status information received from the one or more print servers. Any number of print job status sub-categories may be defined as appropriate for a particular printing enterprise or application. Still further, any number of sub-categories may be associated with each of the multiple top-level categories. The number of such sub-categories need not be identical for each of the multiple top-level categories. Still further, the status represented by the specific sub-categories need not be the same for each of the top-level categories. In one exemplary embodiment, four sub-categories may be defined for each of the multiple top-level categories. An "Error" sub-category may be associated with print jobs that were unsuccessful in some manner. A "Held" sub-category may be associated with print jobs in a status awaiting some further processing or event. A "Pending" or "Processing" sub-category may be associated with print jobs that are presently in process at some stage of the print server processing and/or the print engine processing to generate printed output for the print job. A "Retained" sub-category may be associated with print jobs that were completed (e.g., associated with the "Completed" top-level category) but are being retained for possible re-printing or for other reasons.

Exemplary details of the processing of steps 202 and 204 are presented further herein below with respect to FIGS. 3 and 4. The particular semantic meaning of each sub-category in this exemplary embodiment may differ depending on the top-level category associated with the same print job. The table below provides some further interpretation of one exemplary semantic meaning for the combinations of the exemplary top-level categories and the exemplary sub-categories.

| Top-Level Category | Sub-categories | | |
|---|---|---|---|
| Receiving/Unscheduled | Error (e.g., scheduling was unsuccessful) | Held (e.g., cannot be scheduled) | Processing |

-continued

| Top-Level Category | Sub-categories | | |
|---|---|---|---|
| Waiting to Print | Error | Held | Pending |
| Jobs at Printer | Error | Held | Pending |
| Completed Jobs | Error (e.g., job unable to print) | Processing | Retained (e.g., retained for additional printing) |

Continuing with the method of FIG. 2, step 206 generates and outputs a graphical presentation of the status of all print jobs in a simple, easy to use graphical format. As noted above, in one exemplary embodiment, the information to be presented may be formatted as a web page to be displayed on any suitable web browser client system. Exemplary details of the processing of step 206 are presented further herein below with respect to FIG. 5. Exemplary screen displays representing such a presentation are discussed further herein below with respect to FIG. 6.

The presentation generated and output by step 206 presents a friendly, easy to use graphical user interface providing the user basic information as to how many print jobs are associated with each sub-category (e.g., shown as both a displayed number and as bar chart segments to indicate the relative number of jobs associated with each of the sub-categories). The presentation may also optionally display the number of print jobs associated with each top-level category (e.g., the sub-total of the counts of print jobs associated with each sub-category of each top-level category).

In some cases, a user may wish to review more specific details of each of the print jobs associated with a particular sub-category of a particular top-level category and/or all print jobs associated with a particular identified top-level category. At step 208, user input is received selecting an identified top-level category or an identified sub-category of interest to the user. Responsive to receipt of such user input, step 210 generates and outputs a more detailed presentation of the status of all print jobs associated with the selected top-level category or the selected sub-category. Any suitable format for the additional detailed presentation may be generated by step 210 to provide the status of all print jobs in the selected top-level category or sub-category. In one exemplary embodiment, the additional detailed status may present each print job of the selected top-level category or the selected sub-category as a graphical icon. For example, the icon may be a scaled down (e.g., "thumbnail" size) image of the first page of the print job. The icon may be color-coded, flashing, or utilize other visual indicia to indicate the present status of the associated print job. Further, if the user selects (e.g., clicks on the icon or merely "rolls over" the icon using the mouse or other pointer input device) additional details of the status of the associated print job may be presented (e.g., presented in a pop-up window, in a tool-tip, or presented in any other suitable manner). For example, the size of the selected print job in bytes and/or pages may be presented. Or, for example, the progress of the job in its current state of processing.

Figure 3:
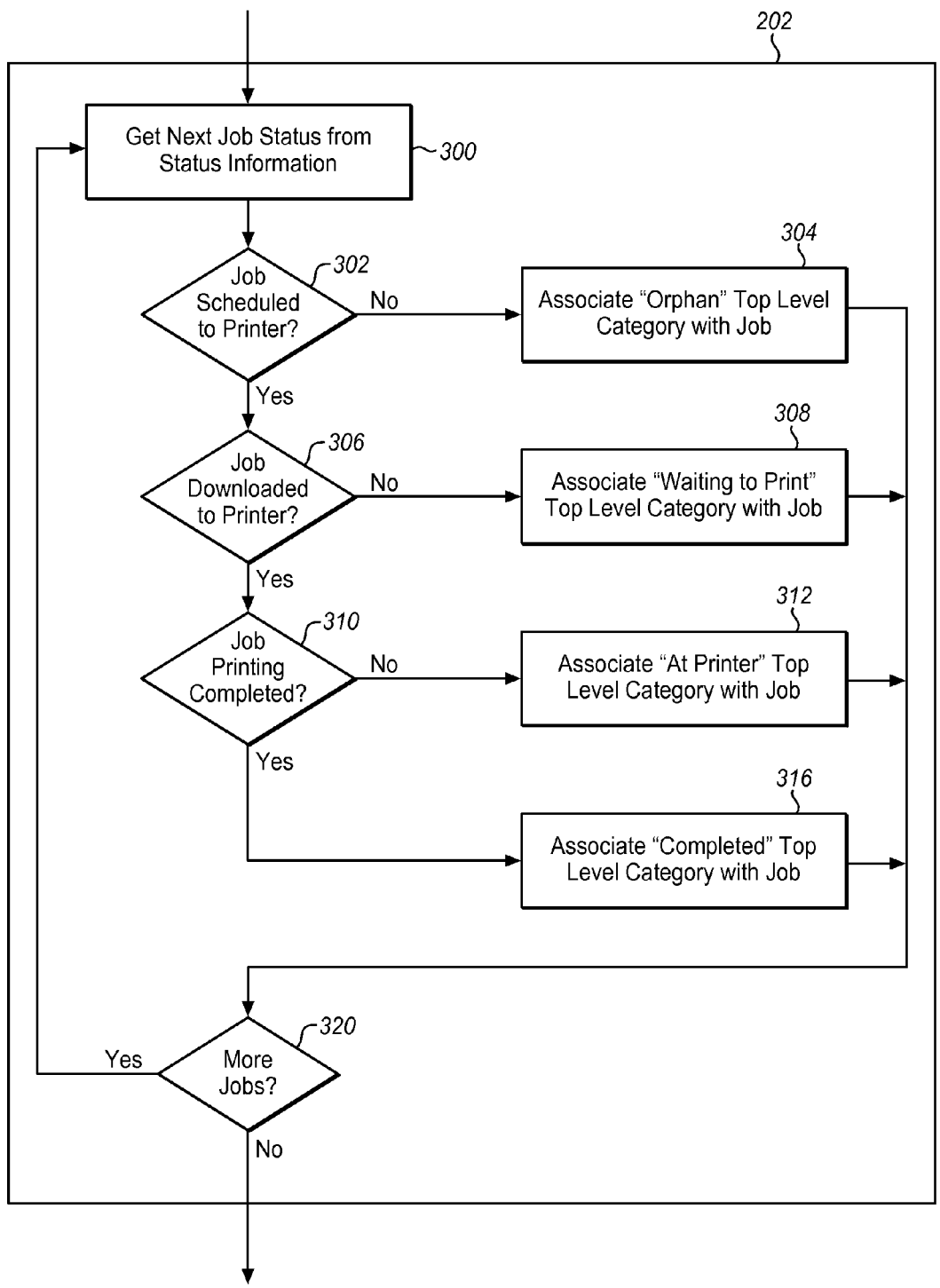

FIG. 3 is a flowchart providing exemplary additional details of the processing of step 202 of FIG. 2 to associate a top-level category with each print job to represent the status of each print job based on the received status information. The method of FIG. 3 describes the process of associating one of the above exemplary top-level categories with each print job. Those of ordinary skill in the art will readily understand how to modify the exemplary method of FIG. 3 to utilize more, fewer, or different top-level categories to associate with each print job.

Step 300 retrieves the next (or first) job status from the received status information. The retrieved job status represents the status of one particular print job being processed by a corresponding print server. Steps 302 through 316 then select a top-level category that best describes the broad status of this print job. More specifically, step 302 determines whether the status information for this current job print job indicates that the job has been scheduled to any printer. A job may be in the process of being received by a print server or may have been completely received but not yet scheduled for any particular print engine. If step 302 determines that the print job has been has not yet been scheduled to a particular printer, step 304 associates the "Receiving/Unscheduled" top-level category with the job and processing continues at step 320 as discussed below. Otherwise, step 306 determines whether the job has been downloaded to the selected printer. If not, step 308 associates the "Waiting to Print" top-level category with the print job and processing continues at step 320 as discussed below. Otherwise, step 310 determines whether the job has completed printing as the identified printer for the print job. If not, step 312 associates the "At Printer" top-level category with the print job and processing continues at step 320 as discussed below. Otherwise, step 316 associates the "Completed" top-level category with the print job. Step 320 then determines whether more print jobs are identified in the status information received from the one or more print servers. If so, processing loops back to step 302 perform the same processing for a next print job until all print jobs identified in the status information have been associated with a top-level category.

Figure 4:
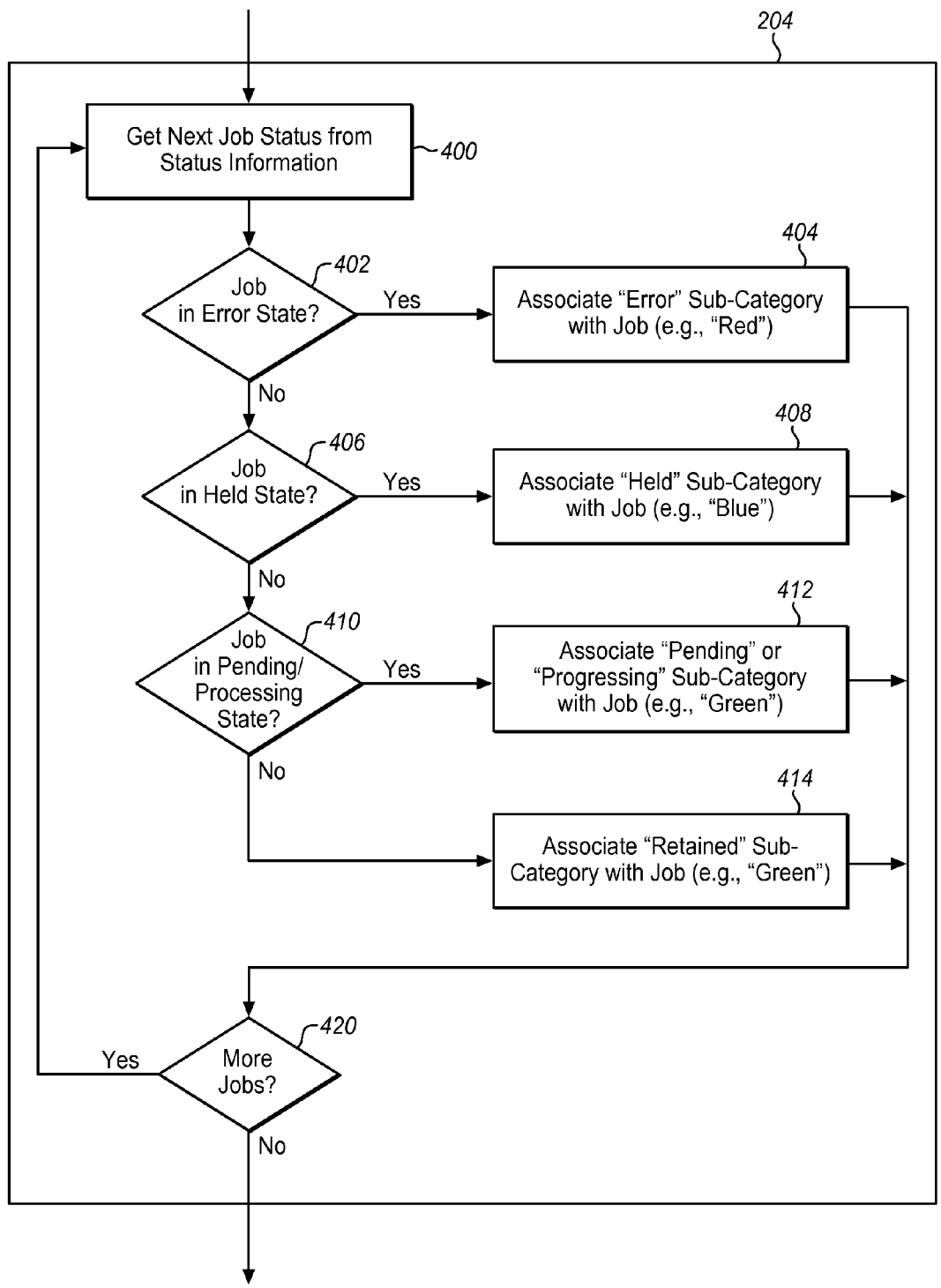

FIG. 4 is a flowchart providing exemplary additional details of the processing of step 204 of FIG. 2 to associate a sub-category representing the status of each print job based on the received status information. Step 400 retrieves the next (or first) job status from the received status information. The retrieved job status represents the status of one particular print job being processed by a corresponding print server. Steps 402 through 414 then select a sub-category that best describes the detailed status of this print job. More specifically, step 402 determines whether the print job is presently in an error state due to some unrecoverable processing error associated with processing of the print job. If so, step 404 associates an "Error" sub-category with the job and processing continues with step 420 as discussed below. Otherwise, step 406 determines whether the job is in a held status state. If so, step 408 associates a "Held" sub-category with this print job and processing continues at step 420 as discussed below. Otherwise, step 410 determines whether the job is in a pending/processing state. If so, step 412 associates a "Processing" or "Pending" sub-category with this print job and processing continues at step 420 as discussed below. Otherwise, step 414 associates a "Retained" sub-category with the print job indicating that the completed print job has been retained (e.g., for additional printing). Step 420 then determines whether more jobs are identified in the received status information remaining to be processed. If so, processing continues looping back to step 400 to get the next job status from the status information and to process the information as discussed above. It will be readily apparent to those of ordinary skill in the art that the number of sub-categories associated with each top-level progress/status category may vary. Further, the semantic meaning associated with each of the sub-categories may vary between the top-level categories. For example, a "Pending" or "Processing" sub-category may indicate a somewhat different meaning depending on the top-level category with which it is associated. For example, the "Retained" sub-category only has meaning in the above exemplary embodiment in conjunction with jobs in the "Completed" top-level category. These and other design choices for associating sub-categories with a top-level category and for associating a top-level category and an associated sub-category with each print job will be readily apparent to those of ordinary skill in the art.

Those of ordinary skill in the art will readily recognize that the processing of the methods of FIGS. 3 and 4 may be integrated in one processing loop structure rather than two distinct loop constructs. Such design choices are readily apparent to those of ordinary skill in the art. Further, those of ordinary skill in the art will readily recognize numerous additional and equivalent top-level categories and status sub-categories that may be identified in other embodiments hereof. Thus, the particular exemplary processing of FIGS. 3 and 4 are merely intended as exemplary of one possible embodiment in a particular exemplary printing enterprise.

Figure 5:
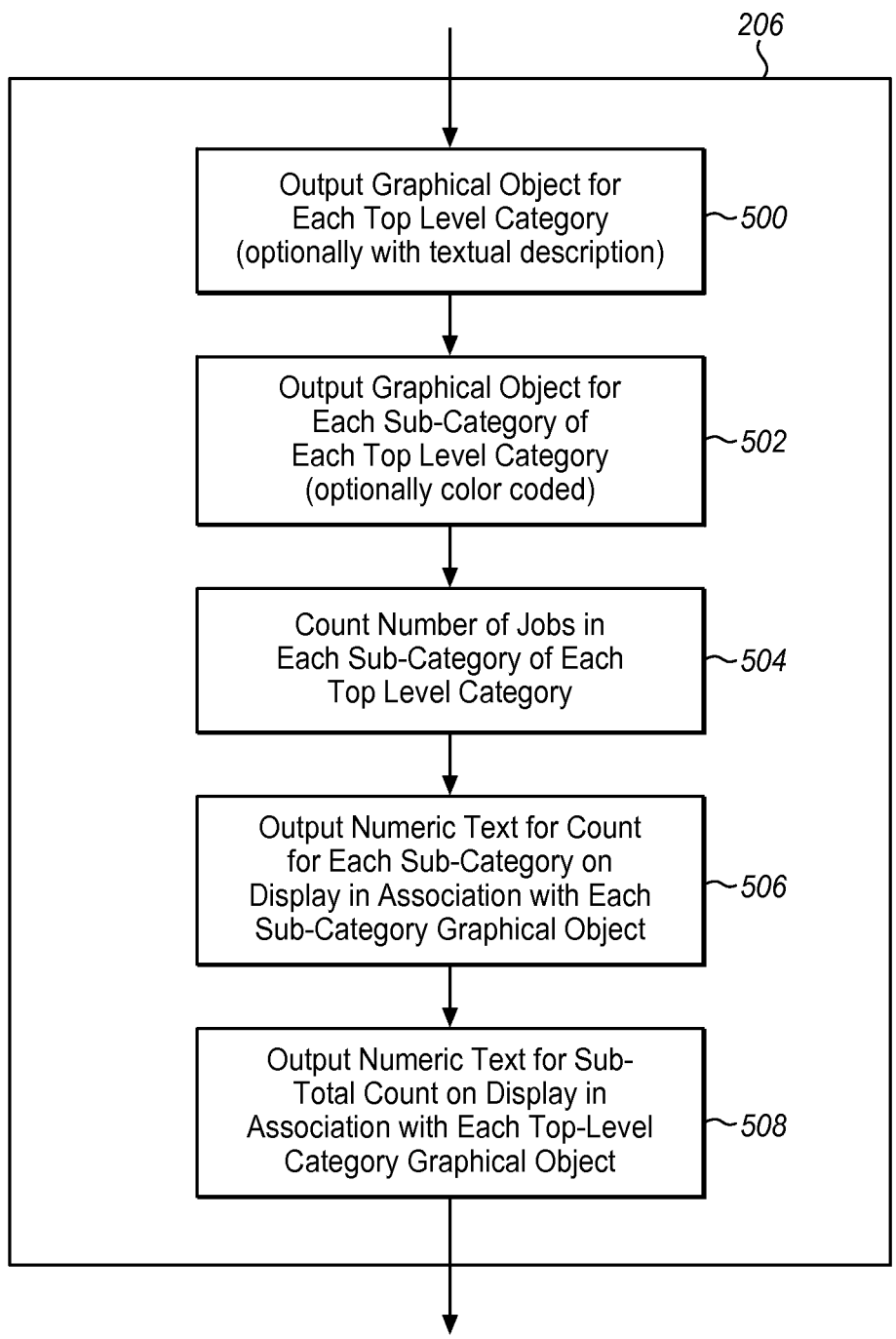

FIG. 5 is a flowchart describing exemplary additional details of the processing of step 206 of FIG. 2 to generate and output a presentation of the status information regarding one or more print jobs. Step 500 first outputs a graphical object to represent each of the multiple top-level categories. Optionally, the graphical object representing a top-level category may include textual description information to further identify the general status/progress associated with the top-level category. Step 502 next associates a graphical object representing each sub-category of each top-level category. In one exemplary embodiment, the sub-category graphical objects may be output so that they visually overlap or are contained within the graphical object representing the corresponding top-level category. Optionally, the graphical object representing a sub-category may include textual description information to further identify the more specific status associated with the corresponding sub-category. Step 504 counts the number of print jobs associated with each sub-category of each top-level category. Thus, a count may be associated with each sub-category of the graphical objects representing the sub-categories. Step 506 then outputs numeric text representing the count for each sub-category on the user's display. The numeric values representing the count of each sub-category may be visually associated with or contained within the sub-category graphical object for each count. Optionally, at step 508, a sub-total of all the count values for all sub-categories of a particular top-level category may be generated. Numeric text indicating the total count may then be output in association with the graphical object representing the top-level category.

In one exemplary embodiment, the graphical objects representing the sub-categories may be color-coded to indicate the severity or degree of operator intervention required (if any). For example, the "Error" sub-category may be color-coded in red to indicate that important operator intervention may be required to recover from an otherwise unrecoverable error in processing of one or more print jobs associated with that sub-category. By contrast, the "Processing" (e.g., "Processing", or "Pending") or "Retained" sub-categories may be color-coded in green indicating that no operator intervention is required for the associated print jobs to continue processing. The "Held" sub-category may be color-coded in blue or yellow indicating that some attention may be desired from the user but is not necessarily required for the associated print jobs to continue processing. Those of ordinary skill in the art will readily recognize that any desired colors may be used for the color-coding to draw appropriate attention to the status of print jobs in each of the sub-categories. Additionally or in the alternative, the optional textual description for each sub-category and/or the count associated with each sub-category may be color-coded. Still further, the graphical objects representing sub-categories in a particular top-level category may be sized relative to one another to indicate the relative number of print jobs associated with each of the sub-categories of the top-level category. For example, the graphical objects for all sub-categories of a top-level category may form a bar such that portions of the bar for each sub-category are sized to represent a percentage of the total number of print jobs in that top-level category.

In one exemplary embodiment, the presentation generated and output by processing of step 206 in FIG. 5 may be a web page generated by processing operable within one or more print servers. The user views the web page using any suitable web-browser client software operable on any suitable computing device coupled with the print server/servers. In accordance with one design choice well known to those of ordinary skill in the art, the web browser client software may reside on and be executed by any suitable computing device including the processing components within one or more of the print servers. Thus, in some exemplary embodiments, the web browser client may simply present the web page generated by other server software (e.g., print server software) running on, or in communication with, others of the one or more print servers. In other exemplary embodiments, a separate system (e.g., system 100 of FIG. 1) may query each of one or more print servers to retrieve status information regarding each of the print jobs under the control of each print server. Having gathered all such status information from the various print servers, the separate system may present the easy to use graphical interface to summarize the status of multiple print jobs. Still further, the processing of associating a top-level category and a corresponding sub-category with each print job based on the status information may be performed by processing within the print servers and/or by processing within the client process that retrieves the status information from the print servers. These and other design choices will be readily apparent to those of ordinary skill in the art.

Those of ordinary skill in the art will readily recognize numerous additional and equivalent steps that may be present in the methods of FIGS. 2 through 5. Such additional and equivalent steps are omitted herein for simplicity and brevity of this discussion.

FIG. 6 is a diagram of an exemplary graphical presentation showing a plurality of graphical objects 600 representing each of the plurality of top-level categories. In addition, each top-level graphical object includes a plurality of graphical objects 602 representing each of the sub-categories associated with the corresponding top-level category. Exemplary color-coding of the sub-category graphical objects is shown as variations in cross hatch patterns in FIG. 6. Still further, the exemplary presentation of FIG. 6 shows the count associated with each sub-category as numeric text overlaying the graphical object of the corresponding sub-category. In addition, a total count is indicated in association with the graphical object for each top-level category representing the total number of print jobs associated with the corresponding top-level category. Optional textual descriptions of each top-level category graphical object and each sub-category graphical object are also shown in the exemplary presentation of FIG. 6. Those of ordinary skill in the art will readily recognize a wide variety of similar presentation formats in which the status of a plurality of print jobs may be represented in an easy to understand graphical format utilizing graphical objects and numeric text to indicate the number of jobs associated with each type of job status.

Although specific embodiments were described herein, the scope of the invention is not limited to those specific embodiments. The scope of the invention is defined by the following claims and any equivalents thereof.

We claim:

1. A method comprising:
receiving status information for print jobs that are being handled by a print server;
using the status information to determine a state for each job that indicates the type of processing being performed on that job;
using the status information to determine a sub-state for each job that further describes the state of that job; and
generating a status report for the print server at a display, the status report comprising:
graphical objects that each represent a state and each include a number showing an amount of print jobs in that state;
graphical objects that each represent a sub-state and each include a number showing an amount of print jobs in that sub-state, where each graphical object for a sub-state is nested within a graphical object for a state; and
graphical indicators that are placed between the graphical objects for states and that visually indicate how print jobs flow between the states,
wherein graphical objects for sub-states of a state form portions of a shape, and the portions of the shape are each sized to represent a percentage of a number of print jobs in that state.

2. The method of claim 1 wherein the status presentation further comprises a textual description within each of the graphical objects that represents a state.

3. The method of claim 1 wherein the status presentation further comprises a textual description within each of the graphical objects that represents a sub-state.

4. The method of claim 1 wherein each graphical object that represents a sub-state is colored to indicate a degree of operator intervention required for print jobs corresponding with that graphical object.

5. The method of claim 4 wherein a red color is associated with an error sub-state to indicate that operator intervention is required to correct the problem.

6. The method of claim 1 wherein the shape comprises a bar.

7. The method of claim 1 further comprising:
receiving user input that selects a graphical object representing a state; and
responsive to receiving the user input, outputting a detail report reflecting additional details of all print jobs in the state that corresponds with the selected graphical object.

8. The method of claim 1 further comprising:
receiving user input that selects a graphical object representing a sub-state; and
responsive to receipt of the user input, outputting a detail report reflecting additional details of all print jobs in the sub-state that corresponds with the selected graphical object.

9. A system comprising:
a network interface operable to receive status information for print jobs that are being handled by a print server;
a processor coupled with the network interface that is operable to use the status information to determine a state for each job that indicates the type of processing being performed on that job, and to use the status information to determine a sub-state for each job that further describes the state of that job,
the processor further operable to generate a status report for the print server that is shown via a user display, the status report comprising:
graphical objects that each represent a state and each include a number showing an amount of print jobs in that state;
graphical objects that each represent a sub-state and each include a number showing an amount of print jobs in that sub-state, where each graphical object for a sub-state is nested within a graphical object for a state; and
graphical indicators that are placed between the graphical objects for states and that visually indicate how print jobs flow between the states,
wherein graphical objects for sub-states of a state form portions of a shape, and the portions of the shape are each sized to represent a percentage of a number of print jobs in that state.

10. The system of claim 9 wherein each graphical object that represents a sub-state is colored to indicate a degree of operator intervention required for print jobs corresponding with that graphical object.

11. The system of claim 10 wherein a red color is associated with an error sub-state to indicate that operator intervention is required to correct the problem.

12. The system of claim 9 wherein the shape comprises a bar.

13. The system of claim 9 further comprising:
a user input device coupled with the processor and operable to receive user input from a user of the system,
wherein the processor is further operable to receive user input via the user input device that selects a graphical object that represents a state,
wherein the processor is further operable, responsive to receiving the user input, to output a detail report reflecting additional details of all print jobs in the state that corresponds with the selected graphical object.

14. The system of claim 9 further comprising:
a user input device coupled with the processor and operable to receive user input from a user of the system,
wherein the processor is further operable to receive user input via the user input device that selects a graphical object that represents a sub-state,
wherein the processor is further operable, responsive to receiving the user input, to output a detail report reflecting additional details of all print jobs in the sub-state that corresponds with the selected graphical object.

15. A non-transitory computer readable medium embodying programmed instructions that, when executed by a computer, perform a method comprising:
receiving status information for print jobs that are being handled by a print server;
using the status information to determine a state for each job that indicates the type of processing being performed on that job;
using the status information to determine a sub-state for each job that further describes the state of that job; and
generating a status report for the print server at a display, the status report comprising:
graphical objects that each represent a state and each include a number showing an amount of print jobs in that state;

graphical objects that each represent a sub-state and each include a number showing an amount of print jobs in that sub-state, where each graphical object for a sub-state is nested within a graphical object for a state; and graphical indicators that are placed between the graphical objects for states and that visually indicate how print jobs flow between the states, wherein graphical objects for sub-states of a state form portions of a shape, and the portions of the shape are each sized to represent a percentage of a number of print jobs in that state.

16. The computer readable medium of claim 15 wherein each graphical object that represents a sub-state is colored to indicate a degree of operator intervention required for print jobs corresponding with that graphical object.

17. The computer readable medium of claim 15 wherein a red color is associated with an error sub-state to indicate that operator intervention is required to correct the problem.

18. The computer readable medium of claim 15 wherein the shape comprises a bar.

19. The computer readable medium of claim 15 the method further comprising:

receiving user input that selects a graphical object representing a state; and responsive to receiving the user input, outputting a detail report reflecting additional details of all print jobs in the state that corresponds with the selected graphical object.

20. The computer readable medium of claim 15 the method further comprising:

receiving user input that selects a graphical object representing a sub-state; and responsive to receipt of the user input, outputting a detail report reflecting additional details of all print jobs in the sub-state that corresponds with the selected graphical object.

* * * * *